Oct. 19, 1937.  F. KRONER  2,096,180

PICTORIAL REPRESENTATION ON A TRANSPARENT CARRIER

Filed Nov. 4, 1936

Inventor:
Friedrich Kroner,
By
Att.

Patented Oct. 19, 1937

2,096,180

UNITED STATES PATENT OFFICE 2,096,180

PICTORIAL REPRESENTATION ON A TRANSPARENT CARRIER

Friedrich Kroner, Berlin-Charlottenburg, Germany, assignor to Transart Aktiebolag, Goteborg, Sweden Application November 4, 1936, Serial No. 109,143
In Germany November 7, 1935

10 Claims. (Cl. 41—22)

The invention relates to a novel kind of pictorial representation or image sheet and a process for producing the same.

It is the object of this invention to apply pictures on a transparent carrier in such a manner that both sides of the carrier carry or show a picture, giving the impression of a perfectly transparent picture or carrier layer, while the picture itself is unaffected by any coloured surface or background which may be located behind or below the picture; in other words, it is the object of my invention to eliminate the "mixing effect" which will be noted when a transparent picture, such as a lantern slide, is placed on any surface or in front of a background which is not of a plain neutral colour, while the transparent nature of the carrier sheet with its inherent advantages is preserved.

Another object of this invention is to present two different pictures when looking upon the carrier sheet from either side thereof, preserving, however, the impression of a transparent carrier layer or picture.

When the term "picture", "pictorial representation" or "image" is used throughout the specification and claims, the term is understood to comprise any kind of a visible representation in the form of a photograph, drawing, diagram, shaded or coloured picture or whatever kind of representation of any object, matter or article of a physical or other nature.

The "carrier layer" used in connection with the present invention may be any suitable transparent sheet material which is preferably very thin and flexible. For instance sheets of cellulose derivatives may be used which are similar to paper, but at the same time absolutely clear and transparent like clear glass, such material sometimes being referred to as "cellulose-glass" or "glass-cellulose." Other materials, such as the so-called "Cellophane", "Cellon" or "Celluloid", regenerated cellulose, cellulose hydrate or the like, may also be used.

Normally, if a picture is printed on any of these transparent sheets, the picture will be visible from both sides, but at the same time the picture itself is also transparent, so that the objects behind the picture will influence the colour etc., of the picture, unless the sheet is placed on a plain white support or bottom layer.

Now, this drawback may be obviated by applying a prime or ground colour on the transparent carrier layer underneath the picture, for instance in the form of a white "body" layer. However, with such a ground layer it is not possible to look at the picture from both sides while this possibility is very desirable for many purposes.

According to the present invention, two individual pictures or pictorial representations are applied to the carrier in such a manner that one of the two pictures will be visible when one face of the carrier sheet is viewed while the other picture will be visible when the other face of the carrier sheet is viewed, the two individual pictures being so superposed or arranged on the carrier that their outer contours coincide; within these outer contours the two pictures are optically separated from each other by at least one intermediate layer which either alone or in combination with the pictures forms an opaque portion of the carrier sheet.

It is thus possible to produce pictures on transparent material which meet the requirement of being visible from either side, permit the use of half tints, shadings or half-tones and at the same time are not impaired by any objects lying behind the picture in the viewing direction.

The surprising effect of an image sheet of this kind resides in the fact that the observer will have the impression that the front and back picture are identical while the two pictures are actually separate or independent representations which moreover may be different as to the subject matter, objects or articles they show. Due to the coinciding contours of the two pictures and the transparency of the portions of the carrier which are outside these contours the illusion is created that one and the same picture is visible on both sides while actually two different pictures will be seen when either side of the carrier is viewed.

According to this invention, the opaque intermediate layer may be applied by the printing of a "body" or "covering" layer on the carrier surface having a neutral, more particularly a white colour, or a colour which is common to the two opposing pictures.

According to a special feature of my invention the two pictorial representations and the neutral intermediate layer may be applied to the same surface of the transparent picture carrier in such a way that the picture which is to be visible from the back is first applied on this surface by any suitable printing or other process, then the opaque or neutral intermediate layer is applied and finally the picture which is to be visible from the front side is printed onto the opaque intermediate layer. By printing the said second picture on the opaque layer I create the illusion of a transparent picture although the two pictures may be different as to their subject matter.

My invention will be better understood by reference to the accompanying drawing showing by way of example and diagrammatically some embodiments of the invention. Of course, it will be understood that various modifications of these embodiments may be made according to the practical requirements, without a departure from the scope of my invention.

Fig. 1 is a schematic cross-section through one form of my novel combination which is produced by both sides of the carrier sheet being printed on;

Figure 1:
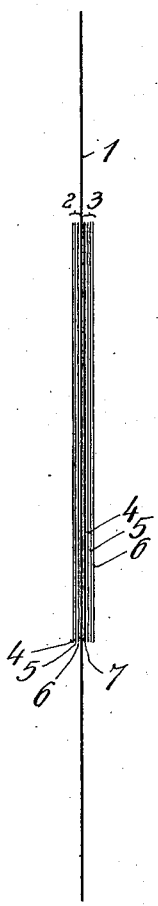

In the drawing, I is the picture carrier which may consist of a glass-like cellulose material, i. e., a material consisting of cellulose which is treated in a special manner so as to form a transparent sheet material which is clear like glass. In all embodiments of my invention which are illustrated, two separate pictures are produced within the same or coinciding contours, the representation or picture 2 being visible on the back or bottom side and the representation or picture 3 being visible on the front or top side of the carrier sheet I.

A plurality of colour layers, for instance three colour layers 4, 5 and 6 may be applied for producing colours which are true to nature including all gradual shadings or half-tones. It is not necessary that the number of the colour layers for the top side picture is the same as that for the bottom side picture.

Any suitable printing or other reproduction process may be used for applying the pictures or colour layers to the carrier, such as for example the colour printing process, lithographic or lithochromatic processes, processes using etched metal plates or the like with recessed, projecting or roughened surfaces for carrying the colour.

According to Fig. 1 a substantially opaque ground or body layer 7 is applied to either face of the transparent sheet I, within the contours of the picture or pictures, before the pictures are applied. I have found that it is not necessary for this ground layer 7 to be absolutely opaque, but the body or covering power should be of such degree or intensity that no "mixing" effect will be noticeable, in other words, that no portions of the back picture will be visible when the front picture is viewed and vice versa. This may be effected in a simple manner for instance by the printing of a "covering" layer onto the transparent sheet, before the picture is produced which will appear in the finished article on the respective side of the transparent sheet. This covering layer may be of a white or any other neutral colour or of a colour which is prevailing in one or both of the pictures or images.

It will be understood that a similar opaque layer 7 may be applied to the bottom or back side of the transparent carrier sheet before the backside picture is applied; thus I may attain a very intensive covering power of this bottom print, or I may make the covering power of the two covering layers so small that they will only by their combined effect give the desired result as to the opaqueness of the whole unit.

I may use different colours or colour tones for the two covering layers 7, and each of the two layers 7 may be adapted or selected in accordance with the respective picture to be applied thereon. Any suitable process may be used for applying these neutral separating layers 7. For example in the embodiments shown in the drawing the requisite covering effect may be attained by a suitable mechanical or chemical treatment of the transparent carrier within the contours of the pictures, for instance by a roughening of the surface of the carrier sheet. Again, I may use a carrier sheet which is originally opaque and the portions thereof outside the contours of the pictures may be rendered transparent like glass, preferably after the pictures have been applied, by any suitable treatment.

If the colour layers of the images are partly opaque per se, I may restrict the application of the additional opaque separating layers to those portions of the picture which are not sufficiently covered by the colours of the picture itself.

Figure 3:
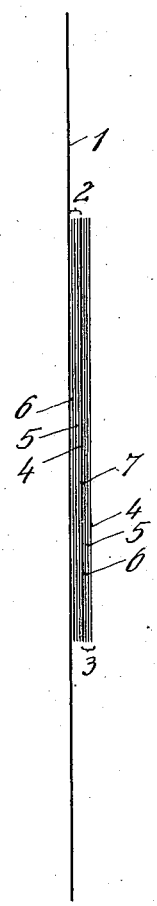

According to a special feature of my invention the process just described may be considerably simplified by applying both pictures, i. e., the picture which shall be visible on the back and the picture which shall be visible on the front of the carrier sheet, on the same face of the carrier sheet, as per Fig. 3.

Figure 2:
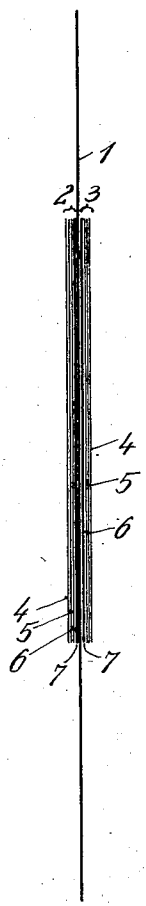
Fig. 2 is a schematic cross-section through a modified form which is also produced by both sides of the carrier sheet being printed on, and Fig. 3 is a schematic cross section through a third form which can be produced by all the layers being printed onto the carrier sheet from one side thereof.

To this end, the image 2 may be first applied to the respective face of the transparent sheet, for instance to the top side, by means of ordinary or colour printing, this image 2 being intended to be visible from the bottom side of the carrier sheet which in this case is not printed. Hereafter the separating or covering layer 7, for instance being in the form of a layer of neutral, e. g., white colour is applied to this image layer 2, for instance by printing, this separating layer in turn being provided with the picture 3 which may be printed thereon in one or several colours and is visible on that side of the carrier which in this case actually carries both images, including the opaque intermediate layer. It will be understood that in this case all the steps for applying both pictures will take place on the same side of the carrier whether the pictures are applied in the normal manner by printing or by any other, manual or artistic, method. This results in a considerable simplification and saving of material both as regards the technical manufacturing process and the tools and machines which are required, since as similar clichés may be used for printing both images, a smaller number of colouring devices is required etc. For example, in the embodiment shown in Fig. 3 only four colouring devices are required for producing half-tone or gradually shaded pictures instead of the seven colouring devices which are required for producing the sheet shown in Fig. 1 and the eight colouring devices which are required for producing the sheet shown in Fig. 2.

I claim:—

1. The combination with a thin sheet of transparent material, of two coinciding images having the same contour applied to said sheet, and at least one opaque layer of like contour intermediate said images.

2. The combination with a thin sheet of transparent material, of an opaque layer and a superposed image on each side of said sheet, said opaque layers and images coinciding with each other and having the same contour.

3. The combination with a thin sheet of transparent material, of an image applied to one side of said sheet, an opaque layer superposed on said image, and a second image superposed on said opaque layer, said two images and said opaque layer having the same contour.

4. The combination with a thin sheet of transparent material, of an image applied to each side of said carrier, both images coinciding and having the same contour, and an opaque portion in said sheet of like contour as said two images and coinciding therewith.

5. The combination with a thin sheet of transparent material, of two images applied to said sheet in coinciding relationship and having the same contour, and a means rendering the sheet between said images opaque within the same contour.

6. A process for producing image carrying sheets of transparent material, comprising applying to the sheet in coinciding relationship two images having the same contour and at least one opaque layer of like contour intermediate said images, thereby making each of said images visible separately from the other image.

7. A process for producing image carrying sheets of transparent material, comprising successively applying to one side of the sheet in coinciding relationship first an image, then an opaque layer and finally a second image, said images and said opaque layer having the same contour.

8. A process for producing image carrying sheets of transparent material, comprising applying to each side of the sheet in coinciding relationship an opaque layer and superposing thereon an image, said opaque layers and said images having the same contour.

9. A process for producing image carrying sheets of transparent material, comprising rendering a portion of the sheet opaque and then applying to each side of the sheet in coinciding relationship with said opaque portion an image, said images and said opaque portion having the same contour.

10. The combination with a thin sheet of transparent material, of two coinciding images of the same contour applied to said sheet, and at least one intermediate opaque layer of like contour being a color which is present in at least one of said two images.

FRIEDRICH KRONER.